United States Patent [19]
Hacking et al.

[11] Patent Number: 5,946,713
[45] Date of Patent: Aug. 31, 1999

[54] MEMORY ATTRIBUTE PALETTE

[75] Inventors: Lance E. Hacking, Portland; Bryant E. Bigbee, Aloha; Shahrokh Shahidzadeh, Beaverton; Shreekant S. Thakkar, Portland, all of Oreg.

[73] Assignee: Intel Corporation, Santa Clara, Calif.

[21] Appl. No.: 08/914,578

[22] Filed: Aug. 18, 1997

[51] Int. Cl.$^6$ ................................................ G06F 12/02
[52] U.S. Cl. ........................ 711/170; 711/2; 711/173
[58] Field of Search .................................... 711/2, 5, 115, 711/170, 173; 395/584, 586, 828, 829, 831

[56] References Cited

U.S. PATENT DOCUMENTS

| | | | |
|---|---|---|---|
| 5,561,814 | 10/1996 | Glew et al. | 395/833 |
| 5,590,289 | 12/1996 | Nardone et al. | 395/289 |
| 5,668,949 | 9/1997 | Nardone et al. | 395/200.31 |
| 5,778,407 | 7/1998 | Glew et al. | 711/2 |
| 5,819,079 | 10/1998 | Glew et al. | 395/584 |

OTHER PUBLICATIONS

Pentium® Pro Family Developer's Manual, vol. 3 Operating System Writer's Guide, chapter 11, pp. 11-1–11-26 (Intel Corp. 1996).

*Primary Examiner*—Eddie P. Chan
*Assistant Examiner*—Than V. Nguyen
*Attorney, Agent, or Firm*—Alan K. Aldous

[57] ABSTRACT

The present invention relates to a computer system in which linear memory attributes are specified. Physical memory attributes may also be specified in physical attribute registers. A memory attribute palette (MAP) receives index signals and selects linear memory attributes in response to the index signals. An effective memory attribute selector receives selected linear memory attribute signals and, if present, the physical memory attribute signals and, in response thereto, selects effective memory attribute signals to present an effective memory attribute. In a preferred embodiment, the linear memory attributes may be programmably written into one or more registers, thereby allowing a program or OS flexibility in the choice of memory attributes, including memory attributes not currently used. The invention allows a program to apply a memory attribute of choice to a particular section of memory, thereby allowing the computer system to provide higher performance.

18 Claims, 3 Drawing Sheets

MEMORY ATTRIBUTE PALETTE

BACKGROUND OF THE INVENTION

1. Technical Field of the Invention

The present invention relates to computer systems and, more particularly, to a computer memory system including a memory attribute palette to specify memory attributes for sections of memory.

2. Description of Prior Art

The Pentium® Pro processor manufactured by Intel Corporation includes two interacting mechanisms that are used together to set the effective memory type of particular sections of memory. The memory type range registers (MTRRs) define the memory attributes for physical address ranges. The page tables allow for memory attributes to be assigned dynamically to linearly addressed pages of memory. The MTRRs are adequate for describing static physical ranges with specific alignment and length constraints that are usually setup by the BIOS, but are incapable of describing the dynamic linearly addressed data structures of programs. The page tables allow for memory attributes to be assigned dynamically to linearly addressed pages of memory. This gives the operating system (OS) and applications flexibility in applying memory attributes to any data structure.

The page tables in the Pentium® Pro processor offer only a subset of all memory attributes including write through (WT), and uncacheable (UC). The page directory and page table entries include two bits, page cache disable (PCD) and page write-through (PWT), to select memory types. While the remaining two memory types could be specified by using the only remaining reserved bit, doing so would prevent introduction of new memory attributes in the future.

Accordingly, there is a need for a means for providing page table memory type encodings to linear memory ranges in a flexible and expandable manner.

SUMMARY OF THE INVENTION

The present invention involves a computer system having a memory attribute palette to receive memory attribute index signals and select linear memory attribute signals responsive to the memory attribute index signals. An effective memory attribute selector receives the linear memory attribute signals and selects effective memory attribute signals responsive to the linear memory attribute signals. Memory management circuitry receives the effective memory attribute signals and provides memory management signals responsive to the effective memory attribute signals. Particular embodiments of the invention may include physical attribute registers to provide physical memory attribute signals to the effective memory attribute selector and wherein the effective memory attribute selector selects the effective memory attribute signals responsive to the linear and physical memory attribute signals.

BRIEF DESCRIPTION OF THE DRAWINGS

The invention will be understood more fully from the detailed description given below and from the accompanying drawings of embodiments of the invention which, however, should not be taken to limit the invention to the specific embodiments described, but are for explanation and understanding only.

DETAILED DESCRIPTION OF PREFERRED EMBODIMENTS

The present invention relates to a computer system in which linear memory attributes are specified. In some embodiments of the invention, physical memory attributes are also specified through, for example, MTRRs. A memory attribute palette (MAP) receives index signals and selects linear memory attributes in response to the index signals. An effective memory attribute selector receives selected linear memory attribute signals and may also receive physical memory attribute signals from physical attribute registers and, in response thereto, selects effective memory attribute signals to present an effective memory attribute. In a preferred embodiment of the invention, the linear memory attributes may be written into one or more registers. This allows the writer of a program or OS flexibility in the choice of memory attributes, including future memory attributes. The invention allows a program to apply a memory attribute of choice to a particular section of memory, thereby allowing the computer system to provide higher performance.

In a preferred embodiment, the memory attribute palette is in a microprocessor. The invention is not restricted to use with a particular type of microprocessor. Indeed, the invention is described in connection with generally understood structures and signals of microprocessors and memories. Particular embodiments of the invention, however, include structures presently used in the Pentium® Pro microprocessor marketed by Intel Corporation and in related chip sets. However, the present invention is not limited to use with the below-recited structure and signals used in the Pentium® Pro microprocessor. Basic structure and signals of the Pentium® Pro microprocessor are described in Pentium Pro Family Developer's Manual, Vol. 1: Specification, Vol. 2: Programmer's Reference Manual, and Vol. 3: Operating System Writer's Manual (in particular Vol. 3, chapter 11) (Intel Corporation, 1996). As used herein, the term "memory attribute" includes, but is not limited to, what is referred to as a "memory type" in connection with the Pentium® Pro processor.

Figure 1:
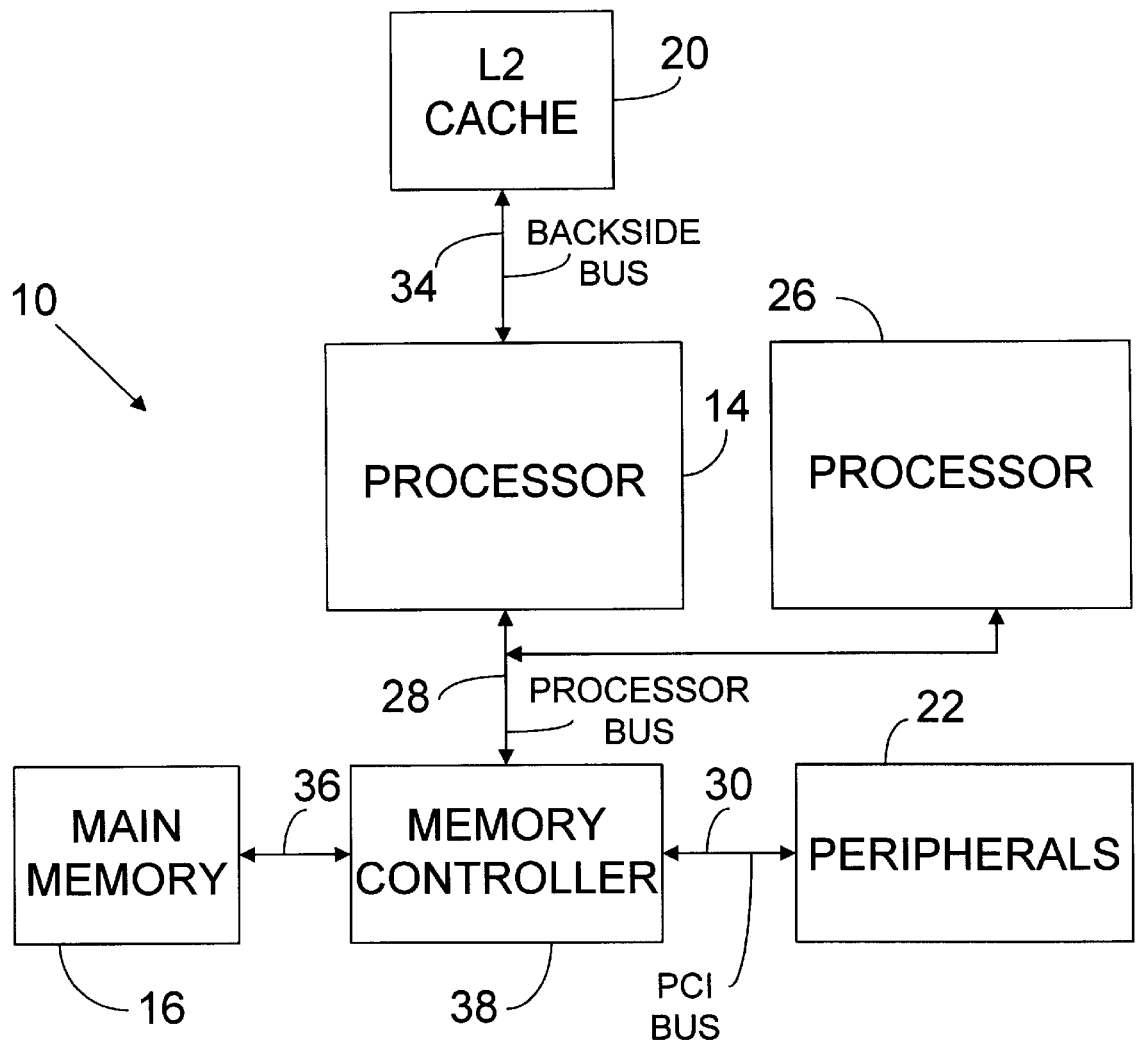
FIG. 1 is a schematic block diagram representation of an exemplary computer system according to one embodiment of the present invention.

Referring to FIG. 1, a computer system 10 includes a processor 14, which also may be called a microprocessor. Computer system 10 includes various memories having different sizes and access speeds with respect to processor 14. The memories include main memory 16, an L2 cache 20, and peripherals 22, an example of which is a hard drive. Data may also be read from or written to an L1 cache which is internal to processor 14. Moreover, computer system 10 may include, one or more additional processors of which processor 26 is representative. Processor 26 may share main memory 16 with processor 14. Data is transmitted over various buses including a processor bus 28, a PCI bus 30, a backside bus 34, and a bus 36. A memory controller 38 controls transfer of data between the various memories and processor 14 and, if it is present, processor 26. Computer system 10 is merely exemplary. A computer system according to the present invention is not required to include all of the components of computer system 10 (e.g., separate L2 cache). Further, memory controller 38 is not restricted to a particular arrangement, such as a look-aside, look-through, write-back, or write-through cache arrangement.

Figure 2:
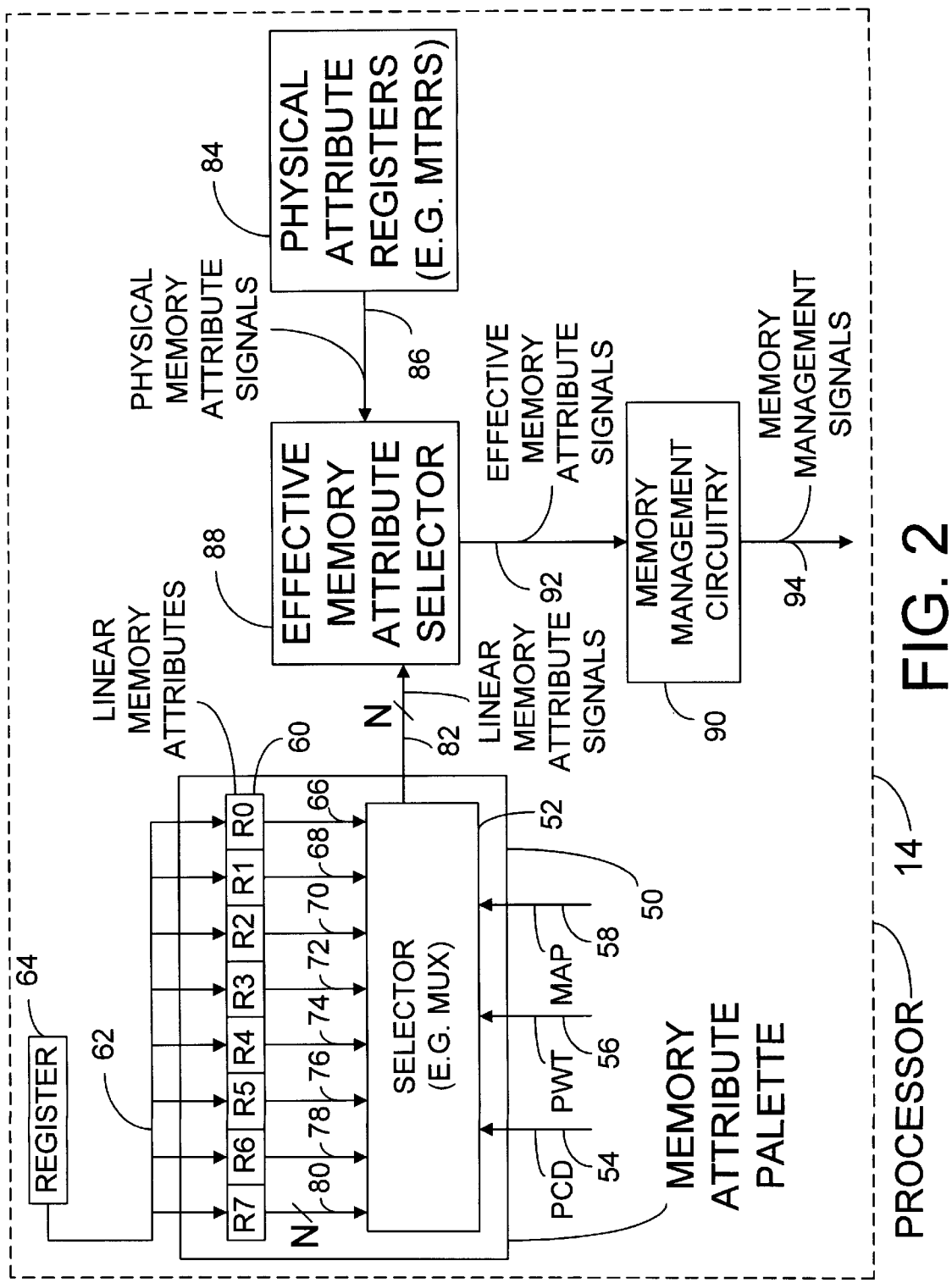
FIG. 2 is a schematic block diagram of certain components of an exemplary processor in the computer system of FIG. 1.

Referring to FIG. 2, a memory attribute palette (MAP) 50 receives memory attribute index signals. In a preferred embodiment, MAP receives three memory attribute index signals: PCD, PWT, and MAP index signals on conductors 54, 56, and 58. PCD (page cache disable) and PWT (page write through) are employed in the Pentium® Pro processor. In the Pentium® Pro processor, the PCD and PWT signals are flag bits 4 and 3, respectively, of control register CR3. In the Pentium® Pro processor, register CR3 is referred to as the page directory base address register, except when the CR4 physical address extension (PAE) bit is set to when, when the CR3 register is referred to as the page directory pointer table.

The PCD and PWT bits are supplied to the page directory entry and page table entry. The MAP index signal is a third index signal that could be supplied in a place of a reserved bit in the control register CR3, page directory entry, and page table entry. Merely as an example, the MAP signal bit may be bit 7 for small (e.g., 4K) page table entries, and bit 12 for page directory entries mapping large (e.g., 2M/4M) pages. The MAP index bit is not defined for register CR3, page directory entries, or page directory pointer entries and is therefore assumed to be zero. Of course, the memory attribute index signals are not required to be referred to as PCD, PWT, and MAP signals or be supplied in connection with the CR3 register, page directory entry, or page table entry.

A selector 52 in MAP 50 selects one of up to eight linear memory attributes stored in a register 60, which is divided into eight linear attribute registers R0, R1, . . . R7. Selector 52, which may be a multiplexer, provides the contents of one of registers R0, R1, . . . R7 to conductors 82 based on states of index signals PCD, PWT, and MAP on conductors 54, 56, and 58. (Any of various multiplexing techniques may be used.) Register 60 could be MSR address 0×277 that is passed as a parameter via the ECX register at ring 0/OS to "rdmsr" (read model specific register) and "wrmsr" (write model specific register) instructions, as in the Pentium® Pro processor. Accordingly, the contents of register 60, or a portion thereof may be changed during operation of a program, allowing a programmer flexibility in the choice of memory attributes. Register 60 may be architecturally defined. (In alternative embodiments of the invention, numerous attributes may be accessed by as few as one or two index signals by changing the contents of a small register.) Register 60 may be a sixty-four bit read/write assessable model specific register (MSR). Alternatively, linear attribute registers R0, R1, . . . R7 may be separate from one another with different addresses. Data may be written into register 60 from a register 64 through a bus 62. As illustrated in FIG. 2, register 64 may be a register internal to a microprocessor such as the ECX register. Alternatively, register 64 may be a location in memory that is internal or external to a microprocessor. Register 64 may represent a group of registers having different memory locations. The attribute data may be accessed through pointers to memory, which register 64 may represent. There may be additional circuitry, which is not illustrated, between register 64 and register 60. Attribute data may be read from register 60 through conductors 66, 68, . . . 80. In a preferred embodiment, conductors 66, 68, . . . 80, and 82 are N bits wide. N may be three, eight, or some other number. Bus 62 and conductors 66, 68, . . . 80 also represent appropriate read and/or write circuitry. Register 60 may be referred to as a palette register because selector 52 has ready access to it. Register 64 may be referred to as an external register (whether or not it is external to processor 14) because it is external to MAP 50.

The following is an example of register 60:

| 31 27 | 26 24 | 23 19 | 18 16 | 15 11 | 10 8 | 7 3 | 2 0 |
|---|---|---|---|---|---|---|---|
| Rsvd | MA3 | Rsvd | MA2 | Rsvd | MA1 | Rsvd | MA0 |

| 63 59 | 58 56 | 55 51 | 50 48 | 47 43 | 42 40 | 39 35 | 34 32 |
|---|---|---|---|---|---|---|---|
| Rsvd | MA7 | Rsvd | MA6 | Rsvd | MA5 | Rsvd | MA4 |

In this example of register 60, bits 0–7 comprise register R0, bits 8–15 comprise register R1, . . . , bits 56–63 comprise register R7. (In this sense, register 60 could be thought of as multiple registers. Further, as explained, the registers could be at different addresses.) Memory attribute 0 (MA0) is within bits 0–2 of register 0. MA0, MA1, . . . MA7 specify eight memory attributes contained within register 60 that are available through MAP 50. As such, MAP 50 is an eight-entry, eight-bit wide programmable table. In the example, Rsvd are the most significant bits for each page attribute and are reserved for future expansion. Of course, memory attributes MA0, MA1, . . . MA7, may be represented by more or less than three bits. In some implementations of structure of FIG. 2, there may be less than eight memory attributes. In such cases, some attributes could be contained in more than one entry of register 60. Alternatively, it could be expected that certain combinations of index signals would not be asserted.

Physical attribute registers 84 provide physical memory attribute signals on conductors 86 to an effective memory attribute selector 88. The physical memory attribute signals represent physical memory attributes. Physical attribute registers 84 may be MTRRs and the physical memory attribute signals may be MTRR memory type signals. Effective memory attribute selector 88 also receives linear memory attribute signals on conductors 82 from selector 52. The linear memory attribute signals represent linear memory attributes. Effective memory attribute selector 88 follows rules of conduct to produce effective memory attribute signals on conductor 92 which are received by memory management circuitry 90. Memory management circuitry 90 supplies memory management signals on conductors 94 responsive to the effective memory attribute signals. As illustrated, memory management circuitry 90 is contained within processor 14, but alternatively could be off processor. The memory management signals are used in controlling the memory operations, such as are, for example, outlined in Table 1, below.

Compatibility with processors of Intel Corporation, including the Intel 486 processor, Pentium® processor, and Pentium® Pro processor, and existing software that runs thereon may be maintained by writing the correct values into register 60, for example, at reset. These initial values may be programmed to provide complete backward compatibility with the previously existing page table memory types and MTRRs. In addition, the default setting provides compatibility for the case where software is utilizing the reserved page table bits defined for MAP 50.

In register 60, the three bits of each of MA0–MA7 could specify, for example, a memory attribute with the same encoding as is used for the Pentium® Pro processor MTRRs as shown in Table 2 (from the Pentium® Pro Family Developers Manual, vol. 3, Table 11-5, p. 11–14), which is produced below as Table 1 to this specification:

TABLE 1

| Mnemonic | Encoding decimal (binary) | Cacheable in L1 and L2 Caches | Writeback Cacheable | Allows Speculative Reads | Memory Ordering Model |
|---|---|---|---|---|---|
| Uncacheable (UC) | 0 (000) | No | No | No | Strong Ordering |
| Write Combining (WC) | 1 (001) | No | No | Yes | Weak Ordering |
| Write-through (WT) | 4 (100) | Yes | No | Yes | Speculative Processor Ordering |
| Write-protected (WP) | 5 (101) | Yes for reads, no for writes | No | Yes | Speculative Processor Ordering |
| Writeback (WB) | 6 (110) | Yes | Yes | Yes | Speculative Processor Ordering |
| Reserved | 2, 3, 7–255 | | | | |

A modification to Table 1 is that encoding '000 is UC and encoding '111 is UC-, described below. Under one embodiment of the invention, encoding '111 remains undefined for the variable MTRRs (VMTRRS) and attempts to write continue to generate a general protection (GP) fault. Attempting to write an undefined memory type encoding into MAP may generate a GP fault like variable MTRRs. Table 1 also illustrates an example of MTRR memory attributes and their properties according to one embodiment of the invention.

Table 2, below, shows how the MAP, PCD, and PWT index signals are used to index into MAP 50 and what register 60 may contain after reset. MAP PCD PWT MAP 50 Memory Attribute at index index index entry Reset

TABLE 2

| MAP index signal bit | PCD index signal bit | PWT index signal bit | MAP 50 entry (decimal) | Memory Attribute at Reset |
|---|---|---|---|---|
| 0 | 0 | 0 | 0 | WB |
| 0 | 0 | 1 | 1 | WT |
| 0 | 1 | 0 | 2 | UC- |
| 0 | 1 | 1 | 3 | UC |
| 1 | 0 | 0 | 4 | WB |
| 1 | 0 | 1 | 5 | WT |
| 1 | 1 | 0 | 6 | UC- |
| 1 | 1 | 1 | 7 | UC |

WB (write back) and WT (write through) are defined in Table 1. UC- and UC are examples of UC (uncacheable), defined in Table 1. UC- occurs when PCD, PWT=10. UC occurs when PCD, PWT=11. As illustrated below in Table 3, in effective memory attribute selector 88, WC from physical attribute registers 84 prevails over UC- from MAP 50. By contrast, in effective memory attribute selector 88, UC from MAP 50 prevails over WC from physical attribute registers 84.

Figure 3:
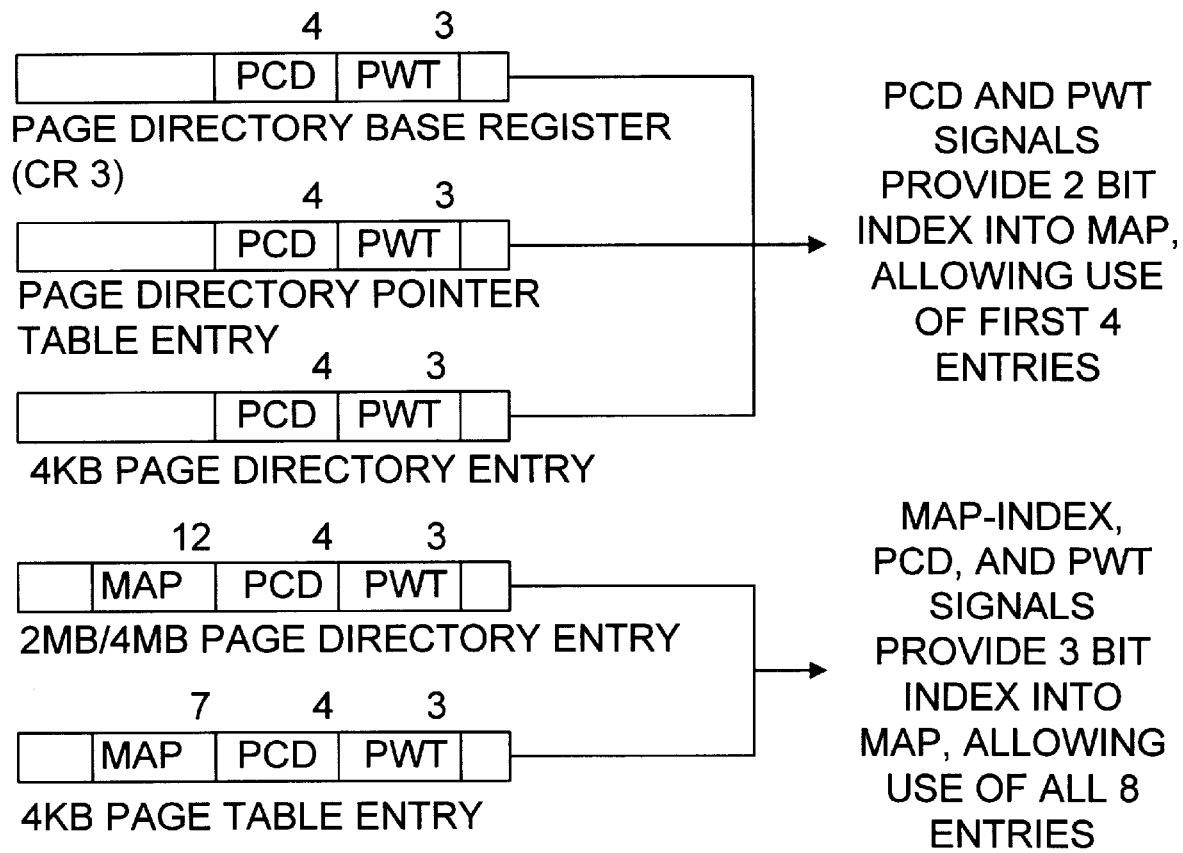
FIG. 3 is a diagram illustrating a memory attribute table index scheme for paging hierarchy according to one embodiment of the invention.

In a preferred embodiment, all eight entries in register 60 are available for describing the 4K/2M/4M page frame. The MAP index bit is not defined in the CR3 register (the page directory pointer tables when physical address extension (PAE) is enabled), or the page directory when it does not describe a large page. In these cases, only PCD and PWT index signals are used to index into MAP 50 limiting the OS to using only the first four entries of register 60 for describing the memory attributes of the paging hierarchy. An example of the MAP index scheme for each level of the paging hierarchy is shown in FIG. 3. Reserved bit faults are disabled for non-zero values for the MAP index bit, but remain present for all other reserved bits. This may be true for each of ModeA/B 4K pages, ModeB 4MB pages, and ModeC 4K/2MB pages.

Effective memory attribute selector 88 applies a mapping to select the effective memory attribute signals to be applied to conductors 82 based on the linear memory attribute and the physical memory attribute. One example of the mapping is presented in Table 3 below:

TABLE 3

| Linear Memory Attribute | Physical Memory Attribute | Effective Memory Attribute |
|---|---|---|
| UC- | WB, WT, WP | UC_PAGE |
| | WC | WC_MTRR |
| | UC_MTRR | UC_MTRR |
| UC | WB, WT, WP, WC | UC_PAGE |
| | UC_MTRR | UC_MTRR |
| WC | X | WC_PAGE |
| WT | WB, WT | WT_PAGE |
| | UC_MTRR | UC_MTRR |
| | WP, WC | Undefined |
| WP | WB, WP | WP_PAGE |
| | UC_MTRR | UC_MTRR |
| | WC, WT | Undefined |
| WB | WB | WB_MTRR |
| | UC_MTRR | UC_MTRR |
| | WC | WC_MTRR |
| | WT | WT_MTRR |
| | WP | WP_MTRR |

The mapping of Table 3 assumes that the cache disable (CD) and nonwrite-through (NW) flags in register CR0, if present, are set to 0. In the particular embodiment of Table 3, the effective memory attribute is undefined in the case wherein the linear memory attribute is WT and the physical memory attribute is WP or WC. The effective memory attribute is also undefined in the case wherein the linear memory attribute is WP and the physical memory attribute is WC or WT. However, in other embodiments, the effective memory attributes could be defined in such cases. UC_MTRR indicates the UC attribute came from the MTRRs and the processor(s) are not required to snoop their caches since the data could never have been cached. This is preferred for performance reasons. UC_PAGE indicates the UC attribute came from the page tables and processors are required to check their caches since the data may be cached from page aliasing. In general, the nomenclature "XX_PAGE" indicates the attribute XX is from the page tables, where the page tables prevail over the MTRRs. The nomenclature "XX_MTRR" indicates the attribute XX is from the MTRRs, where the MTRRs prevail over the page tables. The following comment has application to Table 3 and particular embodiments of the invention that are designed to work with Microsoft OSs. For some Microsoft OSs prior to Windows NT 4.0 service pack 3 (e.g., for DOS, Windows 3.1, Windows 95, early Windows NT versions), software, such as a program fastvid.exe is allowed to change the memory type of the MTRRs from UC to WC without informing the OS, when the OS is using UC- encoding for uncacheable memory. In such a case, the WC will prevail over UC. OS NT 4.0 service pack 3 uses UC rather than UC- in the page tables to prevail over WC in the MTRRs. UC- and UC are described above in connection with Table 1.

Disabling the MTRRs on the Pentium® Pro processor resulted in an effective memory type of UC regardless of enabling paging and the setting of the PCD and PWT index bits. For processors that are MAP enabled, this behavior may be changed. If paging and the MTRRs are disabled, then the effective memory type is UC. If the MTRRs are disabled and paging is enabled, the effective memory type from the page tables/MAP may be used.

Additional Information and Embodiments

The various structures of the present invention may be implemented according to any of various materials and methods known to those skilled in the art. In a microprocessor, there are, of course, numerous components that are not illustrated in the figures or described herein. There may be intermediate structure (such as a buffer) or signals that are between two illustrated structures. Some conductors may not be continuous as illustrated, but rather be broken up by intermediate structure. The borders of the boxes in the figures are for illustrative purposes. An actual device would not have to include such defined boundaries. The relative size of the illustrated components is not to suggest actual relative sizes.

The term "connected" and related terms are used in an operational sense and are not necessarily limited to a direct connection. If the specification states a component "may", "could", or is "preferred" to be included, that particular component is not required to be included.

The MAP feature may be detected by the OS through use of the CPUID instruction. Specifically, the OS may execute the CPUID instruction with the value 1 in the EAX register and then determine support for the feature by inspecting bit 16 of the EDX register return value. If MAP is supported, the OS is permitted to utilize the model specific register specified for programming the page attribute table as well as make use of MAP-index bits formerly reserved in the page tables.

The OS may be responsible for ensuring that changes to a MAP entry occur in a manner that maintains the consistency of the processor caches and translation lookaside buffers (TLB) including, for example, a specific sequence of operations that includes flushing the processor(s) caches and TLBs.

In an embodiment of the invention that is an alternative to that described in connection with FIG. 2, a memory attribute palette produces single bits on parallel conductors in response to particular states of index signals PCD, PWT, and MAP. For example, if there were eight attributes, there could be eight parallel conductors, only one of which would be asserted at a time. An effective memory attribute selector would receive the parallel conductors and respond appropriately to the signals thereon.

MAP may allow any memory type to be specified in the page tables, and therefore it is possible to have a single physical page mapped by two different linear pages that have differing memory types. This practice may lead to undefined results and is, therefore, discouraged. In particular, it is preferred that a WC page not be aliased to a cacheable page because WC writes do not need to check the processor caches.

OSs which do not wish to context switch MAP may have equivalent MAP entry values on all processors.

OSs that use a page directory as a page table and enable page size extensions (PSE) or physical address extensions (PAE) should carefully scrutinize the use of the MAP-Index for 4 KB page table entries (PTEs). The OS can only utilize MAP entries MA0–3 for a 4 Kbyte page table entry (PTE) that is also used as a PDE, since the MAP-index bit for the page table entry (bit7) represents the page size. If the OS attempts to access MAP entries MA4–7 when this memory is used as a PTE, it may inadvertently set the PS bit for when this memory is accessed as a PDE.

If the OS would like to have the page table memory type as defined in MAP always be the effective memory type, then it can set the default MTRR memory type to Write-Back and disable MTRRs that cover regions the OS wishes to manage solely by using the page tables, or disable all the MTRRs.

In a preferred embodiment, MAP 50 is always enabled on all processors supporting it and the table lookup always occurs whenever paging is enabled and for all paging modes (e.g., PSE, PAE).

MAP 50 could be referred to as a page attribute table.

In the present invention, linear memory is to be interpreted broadly to include what is referred to as linear, logical, and virtual addresses.

It is preferred that the linear memory attribute signals represent only one linear memory attribute at a time, the physical memory attribute signals represent only one physical memory attribute at a time, and the effective memory attribute signals represent only one effective memory attribute at a time. Alternatively, one or more of the signals could simultaneously represent more than one of the attributes at a time.

An additional MAP implementation involves priority bits. The implementation may have particular value for testing, and future expansion of attributes. Each entry in the MAP will contain 2 priority bits that will allow that entry to always override or always be overridden by the MTRRs. A 2-bit priority encoding for each entry is represented in Table 4:

TABLE 4

MAP Entry Priority Bits Encoding

| MAP Priority Bits | Meaning |
|---|---|
| 00 | This MAP entry's memory type is combined with the MTRRs memory types according to Pentium ® Pro semantics. MAP priority setting at reset. |
| 01 | This MAP entry's memory type is always overridden by the MTRRs. |
| 10 | This MAP entry's memory type always overrides the MTRRs. |
| 11 | Reserved. |

Alternatively, a single bit could be used as in Table 5:

TABLE 5

MAP Entry Priority Bits Encoding

| MAP Priority Bit | Meaning |
|---|---|
| 0 | This MAP entry's memory type is combined with the MTRRs memory types according to Pentium ® Pro semantics. MAP priority setting at reset. |
| 1 | This MAP entry's memory type always overrides the MTRRs |

Finally, the two bits or single bit could exist for the entire MAP table. The approaches of Tables 4 and 5 are not required. If the OS wants MAP 50 to always override, the OS could disable the MTRRs.

The OS may pick the eight most useful memory attribute combinations and use those for the entire system on all processors. This could, however, be changed once per process. There could be a special instruction pair to save/restore the entire MAP at once.

A new bit MAP[2] may be defined for CR3 and page directory pointer table (PDPT) and use 3 bits to index MAP0–7, whenever possible. In some embodiments, this may work in every case except for a 4K page directory in Mode B or Mode C where there are no reserved bits and bit7 is 0 by definition. The OS therefore could describe its paging structures using all 8 MAP entries except when describing the page tables in these two modes.

Registers 60 do not have to be in processor 14, but rather could be in, for example, main memory 16.

The invention provides a flexible, programmable, and expandable means to make all current and future memory attributes available to both the OS and applications. It also provides a consistent memory attribute usage model for the OS by making all memory attributes available via a single mechanism rather than having some functionality in the page tables and some in the MTRRs.

Those skilled in the art having the benefit of this disclosure will appreciate that many other variations from the foregoing description and drawings may be made within the scope of the present invention. Accordingly, it is the following claims including any amendments thereto that define the scope of the invention.

What is claimed is:

1. A computer system, comprising:
   a memory attribute palette to receive memory attribute index signals and select linear memory attribute signals responsive to the memory attribute index signals;
   an effective memory attribute selector to receive the linear memory attribute signals and to select effective memory attribute signals responsive to the linear memory attribute signals;
   physical attribute registers to provide physical attribute signals to the effective memory attribute selector and wherein the effective memory attribute selector selects the effective memory attribute signals responsive to the linear memory attribute signals and the physical attribute signals;
   memory management circuitry to receive the effective memory attribute signals and to provide memory management signals responsive to the effective attribute signals.

2. The system of claim 1, wherein the physical attribute registers include MTRRs.

3. The system of claim 1, wherein the memory attribute index signals are provided from page table entries.

4. The system of claim 1, wherein the memory attribute palette includes palette registers to store the linear memory attribute signals.

5. The system of claim 4, further comprising at least one external register to which memory attributes signals are stored and then transferred to the palette registers, wherein the at least one external register is accessible to programs and an operating system.

6. The system of claim 4, further including circuitry to read the memory attribute signals from main memory and write the memory attribute signals to the palette registers.

7. The system of claim 4, wherein the memory attribute palette includes a selector connected to the effective memory attribute selector and there are conductors of width N between each of the palette registers and the selector.

8. The system of claim 1, wherein the system includes a microprocessor containing the memory attribute palette and effective memory attribute selector.

9. The system of claim 1, wherein the memory management circuitry is contained within the microprocessor.

10. The system of claim 1, wherein the system includes a personal computer.

11. The system of claim 1, further comprising a memory controller responsive to the memory management signals.

12. A computer system, comprising:
    a memory attribute palette to receive memory attribute index signals and select linear memory attribute signals responsive to the memory attribute index signals;

physical attribute registers to provide physical attribute signals to the effective memory attribute selector;

an effective memory attribute selector to receive the linear memory attribute signals and to select effective memory attribute signals responsive to the linear memory attribute signals and the physical attribute signals; and memory management circuitry to receive the effective memory attribute signals and to provide memory management signals responsive to the effective memory attribute signals.

13. The system of claim 12, wherein the memory attribute palette includes palette registers to store the linear memory attribute signals.

14. The system of claim 13, further comprising at least one external register to which memory attributes signals are stored and then transferred to the palette registers, wherein the at least one external register is accessible to programs and an operating system.

15. The system of claim 13, further including circuitry to read the memory attribute signals from main memory and write the memory attribute signals to the palette registers.

16. The system of claim 12, further comprising a memory controller responsive to the memory management signals.

17. A computer system, comprising:

a memory attribute palette to receive memory attribute index signals and select linear memory attribute signals responsive to the memory attribute index signals;

the memory attribute palette includes palette registers to store the linear memory attribute signals;

at least one external register to which memory attribute signals are stored and then transferred to the palette registers, wherein the at least one external register is accessible to programs and an operating system;

physical attribute registers to provide physical attribute signals to an effective memory attribute selector; and an effective memory attribute selector to receive the linear memory attribute signals and to select effective memory attribute signals responsive to the linear memory attribute signals and the physical attribute signals.

18. The system of claim 18 further including circuitry to read the memory attribute signals from main memory and write the memory attribute signals to the palette registers.

* * * * *